United States Patent [19]

Paeye

[11] Patent Number: 4,697,433
[45] Date of Patent: Oct. 6, 1987

[54] THERMAL ENERGY COLLECTOR

[75] Inventor: Gérard Paeye, Champagne sur Seine, France

[73] Assignee: Jeumont-Schneider Corporation, Puteaux, France

[21] Appl. No.: 721,921

[22] Filed: Apr. 11, 1985

[30] Foreign Application Priority Data

Apr. 13, 1984 [FR] France ................ 84 05866

[51] Int. Cl.⁴ .............................................. A63C 19/10
[52] U.S. Cl. .................................... 62/235.1; 62/477; 62/238.3
[58] Field of Search .................... 62/235.1, 238.3, 477, 62/467

[56] References Cited

U.S. PATENT DOCUMENTS

| | | | |
|---|---|---|---|
| 1,972,427 | 9/1934 | Normelli | 62/120 |
| 2,024,083 | 12/1935 | Young | 62/118 |
| 3,270,512 | 9/1966 | Webb | 62/2 |
| 4,095,428 | 6/1978 | Warren | 60/641 |
| 4,165,952 | 8/1979 | Bennett | 417/207 |
| 4,224,803 | 9/1980 | Greiner | 62/106 |
| 4,448,030 | 5/1984 | Moss | 62/235.1 |

FOREIGN PATENT DOCUMENTS

| | | |
|---|---|---|
| 0086383 | 1/1983 | European Pat. Off. . |
| 2391434 | 5/1977 | France . |
| 2491597 | 10/1980 | France . |
| 2530791 | 7/1982 | France . |

OTHER PUBLICATIONS

Patents Abstracts of Japan, vol. 7, No. 291,17, Dec. 27, 1983.

*Primary Examiner*—Henry A. Bennet
*Attorney, Agent, or Firm*—Rines and Rines, Shapiro and Shapiro

[57] ABSTRACT

A thermal energy collector, intended for a system such as a cooling system of the solar type whose mode of operation includes a phase consisting of adsorption of a fluid by a given material and a subsequent desorption phase, comprises a compartment having an upper surface to be exposed to a source of thermal energy and a bottom surface to be connected to a duct joining the compartment to the aforementioned system, with the adsorptive-desorptive material being placed between these surfaces. To increase the efficiency of the adsorptive-desorptive material, a space is provided between the material and the bottom surface of the compartment, with a supporting layer containing openings being placed beneath the material in order to hold it in place against the upper surface.

2 Claims, 2 Drawing Figures

THERMAL ENERGY COLLECTOR

The present invention pertains to thermal energy collectors which, for example, are used in systems where the mode of operation includes a phase consisting of adsorption of a fluid by a given material and a subsequent desorption phase, as in the instance of cooling systems of the solar type. A patent application pertaining to a solar-powered cooling system, which has been filed in France as patent application No. 82-12824, (corresponding to application Ser. No. 515,761, filed Jul. 21, 1983 in the United States, now U.S. Pat. No. 4,531,384) provides a description of a thermal energy collector of this kind. The aforementioned thermal energy collector consists of a compartment whose inner portion is lined with a material characterized by significant adsorptive or desorptive capabilities.

The previously cited compartment is essentially formed by two surfaces situated opposite one another. The uppermost surface is exposed to the energy source, whereas the bottom surface is usually connected to a duct joining the collector to other portions of a cooling system, in order to allow circulation of a fluid.

The aforementioned system operates in such a manner that, as a result of desorption, the material placed inside the collector shall release the fluid which it contains, in the form of vapors entering the previously cited duct, when thermal energy is transmitted to the collector. In the absence of thermal energy, the aforementioned material shall adsorb fluid entering the collector from the duct.

It has been observed that adsorption and desorption of the fluid essentially occur within the portion of the aforementioned material which is adjacent to the location where the duct is joined to the bottom surface of the collector. In areas which are relatively far from this particular location, adsorption and desorption do not take place with adequate efficiency, inasmuch as it is not possible for the fluid to flow easily. Moreover, the materials which are employed are usually extremely costly.

An object of the present invention, hence, is to overcome this difficulty by means of a simple modification in thermal energy collectors containing adsorptive or desorptive materials as referred to above.

The principal advantage derived from this particular invention is a substantial increase in the efficiency of adsorptive or desorptive materials placed within thermal energy collectors, whereas the net cost shall remain extremely low.

In summary, the present invention therefore pertains to a thermal energy collector of the type having a compartment whose uppermost surface shall be exposed to a source of thermal energy, whereas the bottom surface is usually connected to a duct joining this compartment to the cooling system. In turn, a material which is sufficiently capable of adsorbing and desorbing fluids shall be placed between these two surfaces.

In accordance with the present invention, a space is provided between the adsorptive-desorptive material and the bottom surface of the aforementioned compartment. A supporting layer with suitable openings is placed beneath this adsorptive-desorptive material in order to ensure that it shall be held in place against the previously cited upper surface.

It shall be possible to understand the present invention more fully, as well as other purposes, advantages, and characteristics of said invention, in relation to the description provided hereinafter, which is accompanied by a set of drawings pertaining to an example of this particular invention.

Figure 1:
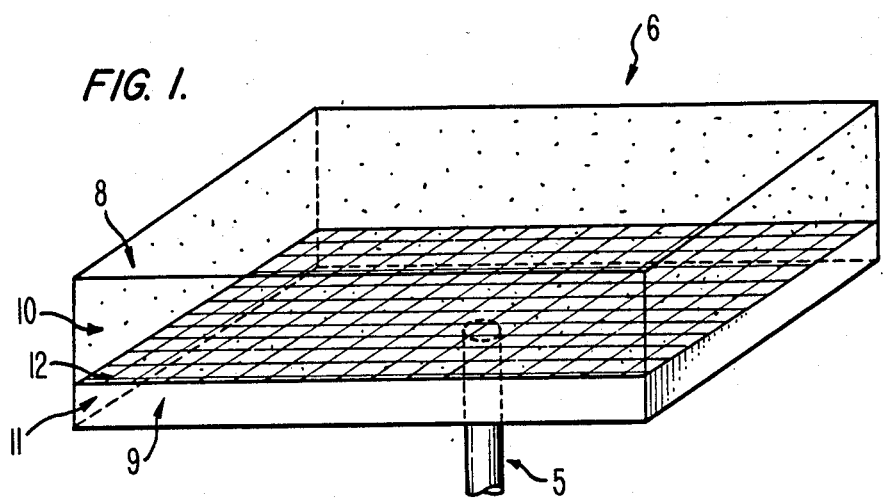
FIG. 1 is a diagram of a thermal energy collector designed in accordance with the present invention.
Figure 2:
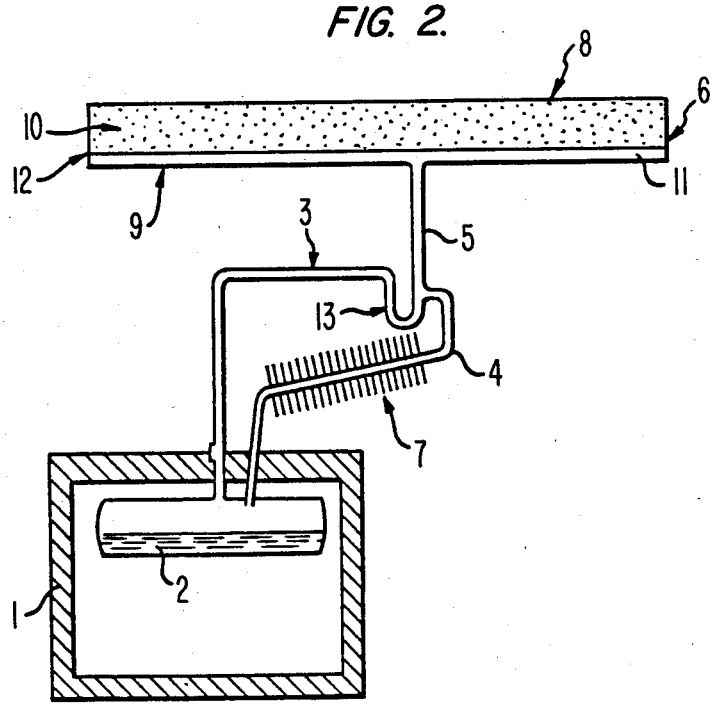
FIG. 2 is a general diagram of a thermally powered cooling system containing a collector designed in accordance with the present invention.

As the previously cited diagrams indicate, a collector (6) consists of a compartment, which is preferably composed of copper. The compartment is essentially formed by two surfaces situated opposite one another, namely an upper surface (8) which is exposed to a source of thermal energy and a bottom surface (9). The inner portion of this compartment (6) is lined with a material (10) characterized by significant adsorption or desorption capabilities, such as zeolite, which is a microporous aluminosilicate compound, with water being used as a fluid in this particular instance. The aforementioned material can also consist of activated charcoal, with methanol being used as a fluid in that instance.

A space (11) is provided within the collector (6), between the aforementioned material (10) and the bottom surface (9). A supporting layer (12) ensures that this material (10) shall be held in place against the uppermost surface (8). It is possible for the supporting layer to be held in place by means of laterally arranged shims, for example. Inasmuch as the lining material (10) is lightweight, it is possible for the shims to be placed solely against the inner walls of the compartment. In turn, a grid or a perforated sheet, for example, can be used as a supporting layer (12). The holes within this supporting layer should be arranged so that it is impossible for the lining material (10) to fall into the space identified as (11), although there should be sufficient permeability in relation to the fluid.

If the aforementioned lining (10) is composed of zeolite in the form of balls or small rods with a diameter of approximately 1.6 millimeters for example, the diameter of the previously cited holes should be less than 1.6 millimeters.

It is preferable for the supporting layer to consist of a perforated sheet, with holes representing a 35 percent proportion, and for the surface area of the collector to be approximately 1 square meter.

The bottom surface (9) of the collector is to be connected to a duct (5) which shall link the collector to a circuit containing a fluid. This circuit shall contain an evaporator (2) situated inside an insulating chamber (1). There shall be a pipe (3) connecting the evaporator (2) to the duct (5) by means of a trap (13), whereas another pipe (4) shall connect the duct (5) to the uppermost portion of a condenser (7), while also connecting the bottom portion of the condenser (7) to the uppermost portion of the evaporator (2).

The cooling system shall operate by means of intermittent supplying of thermal energy (in this instance, thermal energy shall be of solar origin) in the following manner:

In the presence of thermal energy, temperature and pressure levels inside the collector (6) will steadily increase. The lining material (10) will release the fluid by desorption, in the form of vapor. Vapor released during the initial phase shall condense inside the trap (13), thereby obstructing the pipe identified as (3). As the condenser (7) is filled with vapor, condensation shall cause the pressure inside the evaporator (2) to be significantly lower than pressure inside the thermal energy collector (6). Thus, as a result of the difference in pressure, condensed vapor shall flow toward the evaporator (2).

In the absence of thermal energy, the temperature of the material identified at (10) will decrease, and pressure within the condenser (7) and the collector (6) will likewise decrease. At this time, the aforementioned material (10) will adsorb fluid which has accumulated inside the trap (13), as well as fluid contained within the evaporator (2) in the form of vapor. Hence, pressure inside the evaporator will change.

Because the circuit is hermetically sealed and because the evaporation process is endothermic, fluid remaining within the evaporator (2) will solidify. In this way, it will allow a temperature of approximately 0° C. to be maintained within the insulating chamber, even after adsorption has been completed. This adsorption phase which produces cooling shall continue until additional thermal energy is supplied.

It has been ascertained that, as a result of modification of the collector, adsorption and desorption of the fluid occur throughout the surface of the lining material (10). In this way, it is possible to achieve a significant reduction in the pressure drop affecting the fluid during the adsorption phase when it travels toward said lining material (10) from the junction with the duct (5), and during the desorption phase when said fluid travels in the opposite direction.

These reductions in the aforementioned pressure drop allow adsorption and desorption of a greater quantity of fluid in relation to a given volume of the material identified as (10), at the same adsorption and desorption temperatures, when a space (11) has been provided within the energy collector (6) in accordance with the present invention. Thus, it is possible to achieve higher total efficiency.

Furthermore, the previously cited modification allows a significant reduction in heat loss from the bottom surface (9) of the energy collector when thermal energy is being supplied.

Although only certain embodiments of the present invention have been described, it is obvious that any modifications introduced for the same purpose by persons possessing sufficient technical knowledge would not constitute a departure from the context of said invention.

I claim:

1. In a thermal energy collector for use with a solar cooling system and the like having successive operating phases in which, respectively, a fluid is adsorbed by an adsorptive-desorptive material and desorbed by said material, the collector including a compartment having a first surface to be exposed to a source of thermal energy and a second surface opposing said first surface and adapted to be connected to said system and the like by means of a duct, said material being disposed between said first and second surfaces, the improvement wherein:

said first and second surfaces are substantially parallel planar surfaces peripherally joined to one another by sidewalls of said compartment that are substantially perpendicular to said first and second surfaces, said second surface has a generally central opening therein for connection to said duct, said material is supported upon a perforated support surface spaced from said second surface and holding said material in contact with said first surface, said support surface is substantially parallel to said first and second surfaces and is supported within said compartment substantially only at inner surfaces of the sidewalls of said compartment such that there is a large free space between said support surface and said second surface within said compartment, which free space is substantially coextensive with said support surface and said second surface, said material is composed of elements of approximately 1.6 mm in cross dimension, with perforations of said support surface being of lesser cross dimension and representing about 35% of the area of said support surface, and said material is selected from zeolite and activated charcoal, said fluid used with zeolite being water, said fluid used with activated charcoal being methanol.

2. The improvement of claim 1, wherein said collector has an area of approximately one square meter.

* * * * *